(12) United States Patent
Rao et al.

(10) Patent No.: US 8,890,956 B2
(45) Date of Patent: Nov. 18, 2014

(54) COMBINED BACKUP CAMERA AND DRIVER ALERTNESS SYSTEM FOR A VEHICLE

(75) Inventors: Manoharprasad K. Rao, Novi, MI (US); Mark A. Cuddihy, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 341 days.

(21) Appl. No.: 13/314,440

(22) Filed: Dec. 8, 2011

(65) Prior Publication Data

US 2013/0147953 A1 Jun. 13, 2013

(51) Int. Cl.
H04N 7/18 (2006.01)
(52) U.S. Cl.
USPC .......................................... 348/148; 340/435
(58) Field of Classification Search
CPC ............ H04N 7/18; B60Q 1/00; G08B 21/00; G06K 9/00
USPC ......................................................... 348/148
See application file for complete search history.

(56) References Cited

U.S. PATENT DOCUMENTS

| 5,689,241 A | 11/1997 | Clarke, Sr. et al. | |
|---|---|---|---|
| 8,207,835 B2 * | 6/2012 | Schwartz et al. | 340/435 |
| 2006/0073796 A1 | 4/2006 | Collavo et al. | |
| 2006/0135216 A1 | 6/2006 | Collavo et al. | |
| 2008/0158357 A1 | 7/2008 | Connell et al. | |
| 2010/0066519 A1 | 3/2010 | Baur et al. | |
| 2010/0080416 A1 | 4/2010 | Lee et al. | |
| 2013/0293715 A1 * | 11/2013 | Camilleri et al. | 348/148 |

FOREIGN PATENT DOCUMENTS

DE 10223210 A1 12/2003
JP 2005247076 A * 9/2005

OTHER PUBLICATIONS

M. Fornero, et al., Flexible Low Cost Lane Department Warning System, SAE Technical Paper Series 2007-01-1736, Apr. 16-19, 2007.
Anja Van Uytven, On Long Combination Vehicles—Could the Modular Concept be Successfully Introduced in Belgium?, K. U. Leuven Associate, Academiejaar 2004-2005, pp. 1-54.

* cited by examiner

Primary Examiner — Sath V Perungavoor
Assistant Examiner — Janese Duley
(74) Attorney, Agent, or Firm — Frank MacKenzie

(57) ABSTRACT

A combined backup camera and driver alertness system for a vehicle includes an imaging device that is adapted to be supported on a vehicle for capturing images adjacent a rearward portion of the vehicle. A sensor is provided that generates a signal when either (1) a transmission contained in the vehicle is operated in the rearward operating mode or (2) the vehicle is actually moved in the rearward direction. The system also includes a driver alertness processor and an image display. A data router routes the images from the imaging device to the driver alertness processor when not the signal is generated by the sensor and to the image display when the signal is generated by the sensor.

20 Claims, 2 Drawing Sheets

COMBINED BACKUP CAMERA AND DRIVER ALERTNESS SYSTEM FOR A VEHICLE

BACKGROUND OF THE INVENTION

This invention generally relates to camera-based obstacle avoidance systems for vehicles. In particular, this invention relates to an improved structure for a combined backup camera and driver alertness system for a vehicle.

When a vehicle is traveling in a reverse direction, the potential exists for collisions with both stationary and moving objects such as fire hydrants, guardrails, other vehicles, pedestrians, bicycle riders, children, animals, etc. To reduce the potential for collisions, some vehicles are provided with obstacle avoidance systems that use rearwardly viewing camera that provide the vehicle operator enhanced ability to view objects at the rear of the vehicle. These camera-based obstacle avoidance systems display images from the camera on a display, allowing a driver of the vehicle to more easily see objects that might otherwise be hidden from his or her view. These camera-based obstacle avoidance systems can also include an image processor that supplements the images from the camera by highlighting objects that are calculated to be in the path of the vehicle and/or suggesting directions for evasive movement. Some of these camera-based obstacle avoidance systems can also generate a warning signal to the driver, such as an audio signal, when it has been calculated that the vehicle may be about to collide with an object in its path of movement. Other camera-based obstacle avoidance systems are known to automatically implement collision avoidance measures, such as applying the vehicle brakes, when a collision with an object is imminent.

Driver fatigue is also a known causes of accidents, particularly when the vehicle is traveling in a forward direction. To address this, a variety of devices are known that generate a warning signal when certain characteristics of driver fatigue have been sensed or calculated. One of such characteristics is the relationship of the vehicle to lane markers on the road, referred to as road lane drift. Road lane drift typically refers to the gradual movement of the vehicle from a centered position on a road lane (as determined by the lane markers on the road) laterally toward such lane markers. Driver alertness systems traditionally use a forward aimed detection device, such as a camera or other sensor, to monitor the position of the vehicle relative to lane markers on the road. These driver alertness systems include algorithms that use the images from the camera (specifically, the locations of the lane markers that are illustrated in such images) to calculate the path of the vehicle relative to the lane markers. If the vehicle is drifting, weaving, or otherwise moving relative to the lane markers in a manner that suggests driver fatigue is occurring, the driver alertness system can generate an audio, optical, or tactile warning to the driver.

As mentioned above, driver alertness systems typically use a forwardly directed camera. Externally mounted camera and other road monitoring devices can be affected by weather conditions, such as wet roads, rain, snow, etc. that can partially obstruct the view of the lane markers on the road. Additionally, road hazards (such as stones and other debris) also can damage external monitoring devices. For these reasons, the cameras of many driver alertness systems are mounted in a passenger compartment of the vehicle, frequently adjacent to a rear view mirror provided on a front windshield. However, in this location, the camera is located relatively far from the surface of the road and, consequently, must "look" at the road from over the vehicle hood. Consequently, the camera is blocked from capturing images from the portion of the road that is immediately in front of the vehicle, and the lane markers that are visible to the camera are generally ten feet or often more in front of the vehicle. In addition, when the camera is located within the passenger compartment of the vehicle, the front windshield may distort the images that are captured thereby. Thus, it would be desirable to provide an improved structure for a combined backup camera and driver alertness system for a vehicle that avoids the issues mentioned above.

SUMMARY OF THE INVENTION

This invention relates to an improved structure for a combined backup camera and driver alertness system for a vehicle. The system includes an imaging device that is adapted to be supported on a vehicle for capturing images adjacent a rearward portion of the vehicle. A sensor is provided that generates a signal when either (1) a transmission contained in the vehicle is operated in the rearward operating mode or (2) the vehicle is actually moved in the rearward direction. The system also includes a driver alertness processor and an image display. A data router routes the images from the imaging device to the driver alertness processor when the signal is not generated by the sensor and to the image display when the signal is generated by the sensor.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
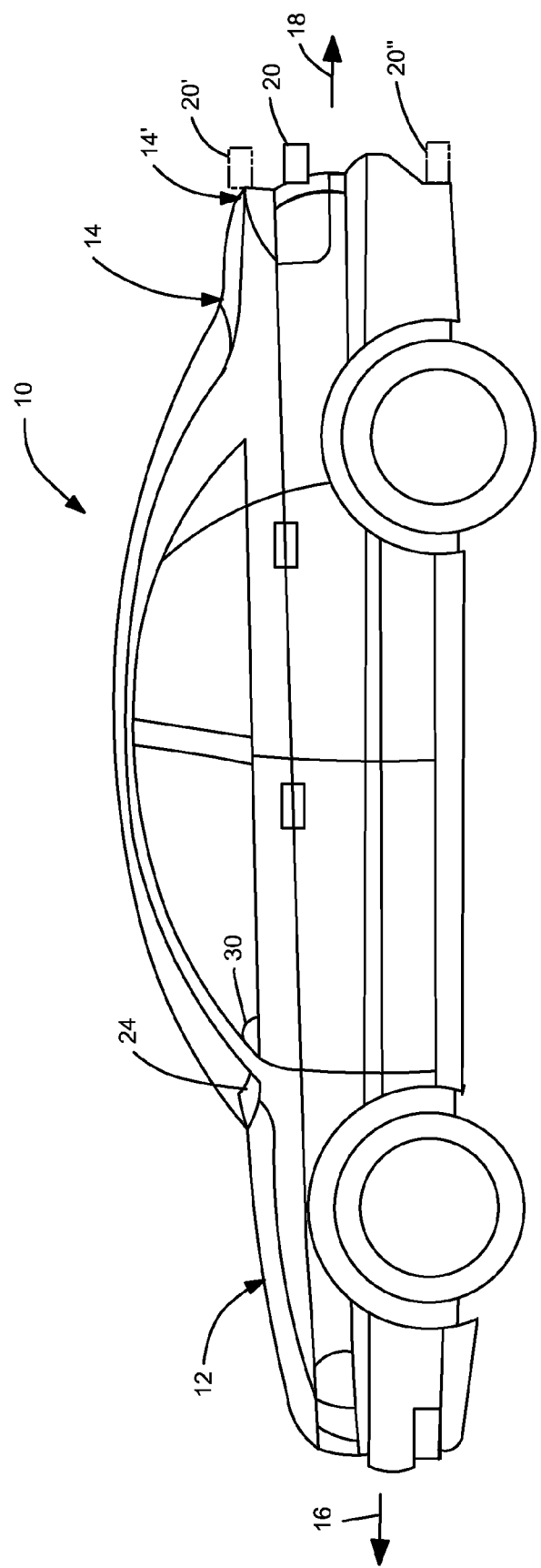
FIG. 1 is schematic view of a vehicle including a combined backup camera and driver alertness system in accordance with this invention.

Referring now to the drawings, there is illustrated in FIG. 1 a vehicle 10 that includes a front portion 12 and a rear portion 14. As is well known in the art, the vehicle 10 is designed to operate in either a forward direction 16 or a rearward direction 18. An imaging device, such as a camera 20, is supported on the rear portion 14 of the vehicle 10, just above the license plate in the illustrated embodiment. Alternatively, as shown in phantom in FIG. 1, the camera 20 may be supported near on a trunk lid 20' or on a rear bumper 20". Preferably, the camera 20 is located close to a rearward most portion of the vehicle 14' so that the camera 20 does not have to be aimed over the trunk lid 20'. This positioning also allows the camera 20 to capture areas immediately behind the vehicle 10. The camera 20 is preferably provided with a wide angle or fish-eye lens that can cover a wide area over a short distance, which is suitable for use in both backup imaging and lane departure warning systems. The vehicle 10 includes a dashboard 24 having an instrument panel with a image display 30 for selectively displaying images generated from the camera 20. As will be explained below, the image display 30 can assist a driver of the vehicle 10 to detect obstacles behind the vehicle 10, especially those that below or off to the sides of the sight line of the rear view mirrors on the vehicle 10.

Figure 2:
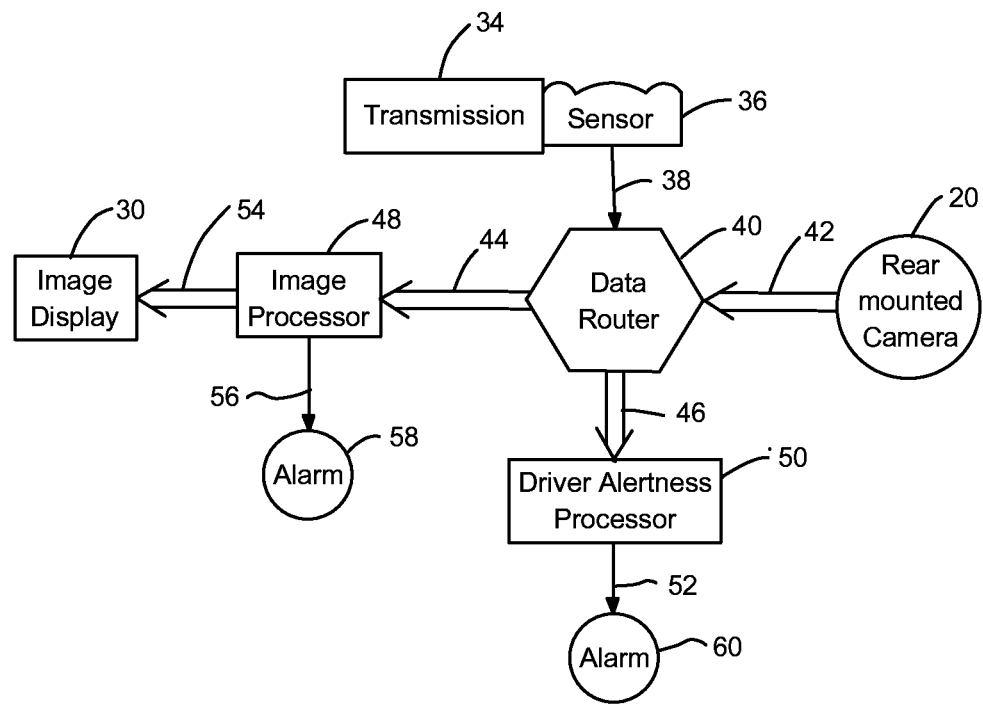
FIG. 2 is a block diagram of a first embodiment of the combined backup camera and driver alertness system of this invention.

As shown in FIG. 2, the vehicle 10 includes a transmission 34 that can be selectively operated in either a forward operating mode (wherein a forward gear ratio is selected for use such that the vehicle 10 can be moved in the forward direction 16) and a rearward operating mode (wherein a reverse gear ratio is selected for use such that the vehicle 10 can be moved in the rearward direction 18). A sensor 36 is responsive to the operating mode of the transmission 34 for generating a signal when the transmission 34 is operated in the rearward operating mode. To accomplish this, the sensor 36 may be mounted directly on the transmission 34 as shown or may be located remotely therefrom. Alternatively, the sensor 36 can be responsive to movement of a component within the transmission 34 so as to generate the signal when the vehicle 10 is actually moved in the rearward direction 18. Other devices can be used to generate a signal when the vehicle 10 is actually moved in the rearward direction 18. For example, the image generated by the camera 20 may be fed to a conventional image processor (not shown) that can calculate when the vehicle 10 is moving in the rearward direction 18. Also, the position of a gear shift lever (not shown) of the transmission 34 can be used to determine when to generate the signal. Conversely, it is also possible to generate the signal by determining when the transmission 34 is operated in the forward operating mode or when the vehicle 10 is actually moved in the forward direction 16.

The sensor 36 communicates over a wire 38 or other conventional data path (such as a wireless connection) with a data router 40. Thus, the signal from the sensor 36 is fed to data router 40 when the transmission 34 is operated in the rearward operating mode or when the vehicle 10 is actually moved in the rearward direction 18. The camera 20 also communicates over a wire 42 or other conventional data path (such as a wireless connection) with the data router 40. Thus, the images from the camera 20 are also fed to the data router 40 whenever the camera 20 is operated.

The data router 40 is configured to selectively route the images from the camera 20 to either a rear image processor 48 or to a driver alertness processor 50. When the data router 40 is receiving a signal from the sensor 36 (which, as discussed above, indicates that either the transmission 34 is operating in the rearward operating mode or that the vehicle 10 is actually moving in the rearward direction 18), the data router 40 routes the images from the camera 20 to the rear image processor 48 over a wire 44 or other conventional data path (such as a wireless connection). Alternatively, when the data router 40 is not receiving a signal from the sensor 36 (which, as also discussed above, indicates that either the transmission 34 is operating in the forward operating mode or that the vehicle 10 is actually moving in the forward direction 16), the data router 40 routes the images from the camera 20 to the driver alertness processor 50 over a wire 46 or other conventional data path (such as a wireless connection).

Thus, whenever the data router 40 is receiving the signal from the sensor 36, the data router 40 routes the images from the camera 20 to the rear image processor 48. The rear image processor 48 may, if desired, superimpose additional information on the images from the camera 20 in a known manner, then route the images from the camera 20 to the image display 30 through over a wire 54 or other conventional data path (such as a wireless connection). The rear image processor 48 may additionally analyze the images from the camera 20 to determine a collision with a object behind the vehicle 10 is imminent. If such a collision is determined to be imminent, the rear image processor 48 can send a signal over a wire 56 or other conventional data path (such as a wireless connection) to a rear obstacle alarm 58.

On the other hand, whenever the data router 40 is not receiving the signal from the sensor 36, the data router 40 routes the images from the camera 20 to the driver alertness processor 50. The driver alertness processor 50 is configured to make a determination regarding driver fatigue or drowsiness. The images from the camera 20 may be provided from the data router 40 to the driver alertness processor 50 in a form of data other than images. The data represents vehicle positions relative to the road and, more specifically, relative to road edges, lane lines, and centerlines, as is known in the art. Algorithms are known in the art for determining or estimating the state of driver awareness, distraction, drowsiness, or fatigue using data relating to the vehicle lane inconsistency, such as weaving relative to road markers or indicating the vehicle is about to cross a road marker.

If a determination is made by the driver alertness processor 50 that a driver issue exists, such as fatigue, drowsiness or distraction, the driver alertness processor 50 sends a signal over a wire 52 or other conventional data path (such as a wireless connection) to an alarm 60. The alarm 60 can be expressed in any desired form including, for example: an audio alarm in the form of the vehicle horn sounding or the radio volume increasing; a visual alarm in the form of a flashing light or display on the video imaging device 20; and a tactile alarm in the form of a vibrating seat or steering wheel. One or more of these alarms may be generated simultaneously or sequentially, depending on the severity of the state of the driver as determined by the driver alertness processor 50.

This invention has many advantages over previously used systems. Utilizing the rear viewing camera 20 for lane drift purposes provides improved data because a rear viewing camera 20 is usually mounted much lower than a typical passenger compartment-mounted front facing camera and may monitor road markers immediately behind the vehicle. Road monitoring systems are typically more accurate when the images from the camera 20 are taken in closer proximity of the vehicle. In addition, vehicle aerodynamics typically allow a more clear vision of the road behind the vehicle during precipitation in the form of rain, snow, or wet roads. A rear monitoring device also is less susceptible to damage from stones and road debris. It also is contemplated that the driver alertness processor 50 may be adapted to interpret vehicle fishtailing or other loss of control events that, at present, are determined using antiskid or similar systems. Rear facing monitoring devices may well be more suitable for this purpose.

This invention can easily be incorporated into vehicle designs using a rear view camera and direction sensor which may have been used in previous vehicle designs by the addition of a data router and forward direction alert system. The present invention similarly may be incorporated into existing vehicles having a rear view camera.

Figure 3:
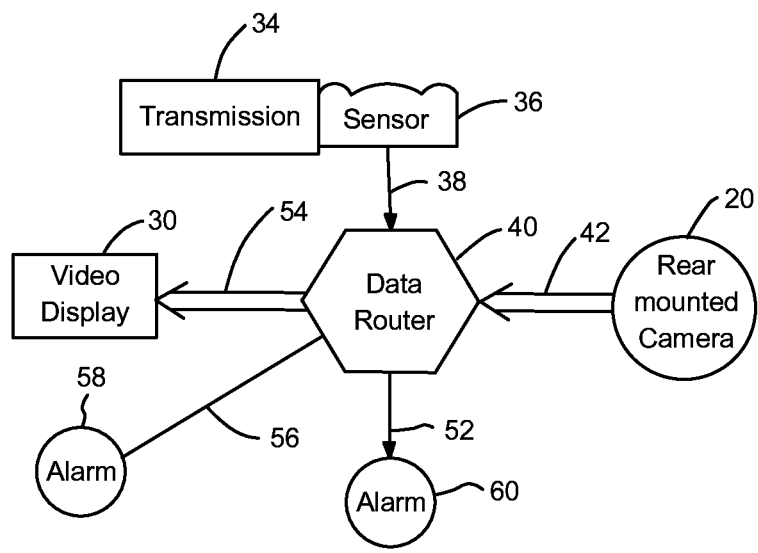
FIG. 3 is a block diagram of a second embodiment of the combined backup camera and driver alertness system of this invention.

Referring to FIG. 3, in an alternate embodiment, the rear image processor 48 and the driver alertness processor 50 can be combined into a single microprocessor that is incorporated into the data router 40. This combined processor could contain the software for both functions, as well as an input from the transmission direction sensor. It could perform the routing of the video data to the appropriate algorithm for rear obstacle detection or driver drowsiness detection, and also determine whether to send the processed video data to the image display 30 based on the transmission direction sensor input.

The principle and mode of operation of this invention have been explained and illustrated in its preferred embodiment.

However, it must be understood that this invention may be practiced otherwise than as specifically explained and illustrated without departing from its spirit or scope.

What is claimed is:

1. A combined backup imaging device and driver alertness system for a vehicle comprising:
    an imaging device adapted to be supported on a vehicle for capturing images adjacent a rearward portion of the vehicle;
    a sensor that generates a signal when either (1) a transmission contained in the vehicle is operated in the rearward operating mode or (2) the vehicle is moved in a rearward direction;
    a driver alertness processor;
    an image display; and
    a data router, wherein (1) when the signal is not generated by the sensor, the data router routes the images from the imaging device to the driver alertness processor and not the image display, and (2) when the signal is generated by the sensor, the data router routes the images from the imaging device to the image display and not to the driver alertness processor.

2. A system as defined in claim 1 wherein the imaging device is a camera.

3. A system as defined in claim 1 wherein the sensor generates the signal when a transmission contained in the vehicle is operated in the rearward operating mode.

4. A system as defined in claim 1 wherein the sensor generates the signal when the vehicle is moved in the rearward direction.

5. A system as defined in claim 1 further including an image processor that receives the images from the data router and sends the images to the image display.

6. A system as defined in claim 5 further including a warning signal that is generated by the image processor when the image processor has calculated that a collision by the vehicle with an object is imminent.

7. A system as defined in claim 5 wherein the image processor highlighting objects in the images that are calculated to be in a path of the vehicle.

8. A system as defined in claim 5 wherein the image processor automatically implements a collision avoidance measure when the image processor has calculated that a collision by the vehicle with an object is imminent.

9. A system as defined in claim 1 wherein the driver alertness processor is responsive to road lane drift for generating an alarm.

10. A system as defined in claim 1 wherein the driver alertness processor includes an algorithm for determining or estimating a state of driver awareness, distraction, drowsiness, or fatigue.

11. A combined backup imaging device and driver alertness system in a vehicle comprising:
    a vehicle containing a transmission;
    an imaging device supported on the vehicle for capturing images adjacent a rearward portion of the vehicle;
    a sensor that generates a signal when either (1) the transmission contained in the vehicle is operated in the rearward operating mode or (2) the vehicle is moved in a rearward direction;
    a driver alertness processor;
    an image display; and
    a data router, wherein (1) when the signal is not generated by the sensor, the data router routes the images from the imaging device to the driver alertness processor and not the image display, and (2) when the signal is generated by the sensor, the data router routes the images from the imaging device to the image display and not to the driver alertness processor;
    a data router that routes the images from the imaging device to the driver alertness processor when the signal is not generated by the sensor and to the image display when the signal is generated by the sensor.

12. A system as defined in claim 11 wherein the imaging device is a camera.

13. A system as defined in claim 11 wherein the sensor generates the signal when a transmission contained in the vehicle is operated in the rearward operating mode.

14. A system as defined in claim 11 wherein the sensor generates the signal when the vehicle is moved in the rearward direction.

15. A system as defined in claim 11 further including an image processor that receives the images from the data router and sends the images to the image display.

16. A system as defined in claim 15 further including a warning signal that is generated by the image processor when the image processor has calculated that a collision by the vehicle with an object is imminent.

17. A system as defined in claim 15 wherein the image processor highlighting objects in the images that are calculated to be in a path of the vehicle.

18. A system as defined in claim 15 wherein the image processor automatically implements a collision avoidance measure when the image processor has calculated that a collision by the vehicle with an object is imminent.

19. A system as defined in claim 11 wherein the driver alertness processor is responsive to road lane drift for generating an alarm.

20. A system as defined in claim 11 wherein the driver alertness processor includes an algorithm for determining or estimating a state of driver awareness, distraction, drowsiness, or fatigue.

* * * * *